Feb. 25, 1930. J. STREHLE 1,748,686
SAW SHARPENING MACHINE
Filed Jan. 13, 1927 2 Sheets-Sheet 1
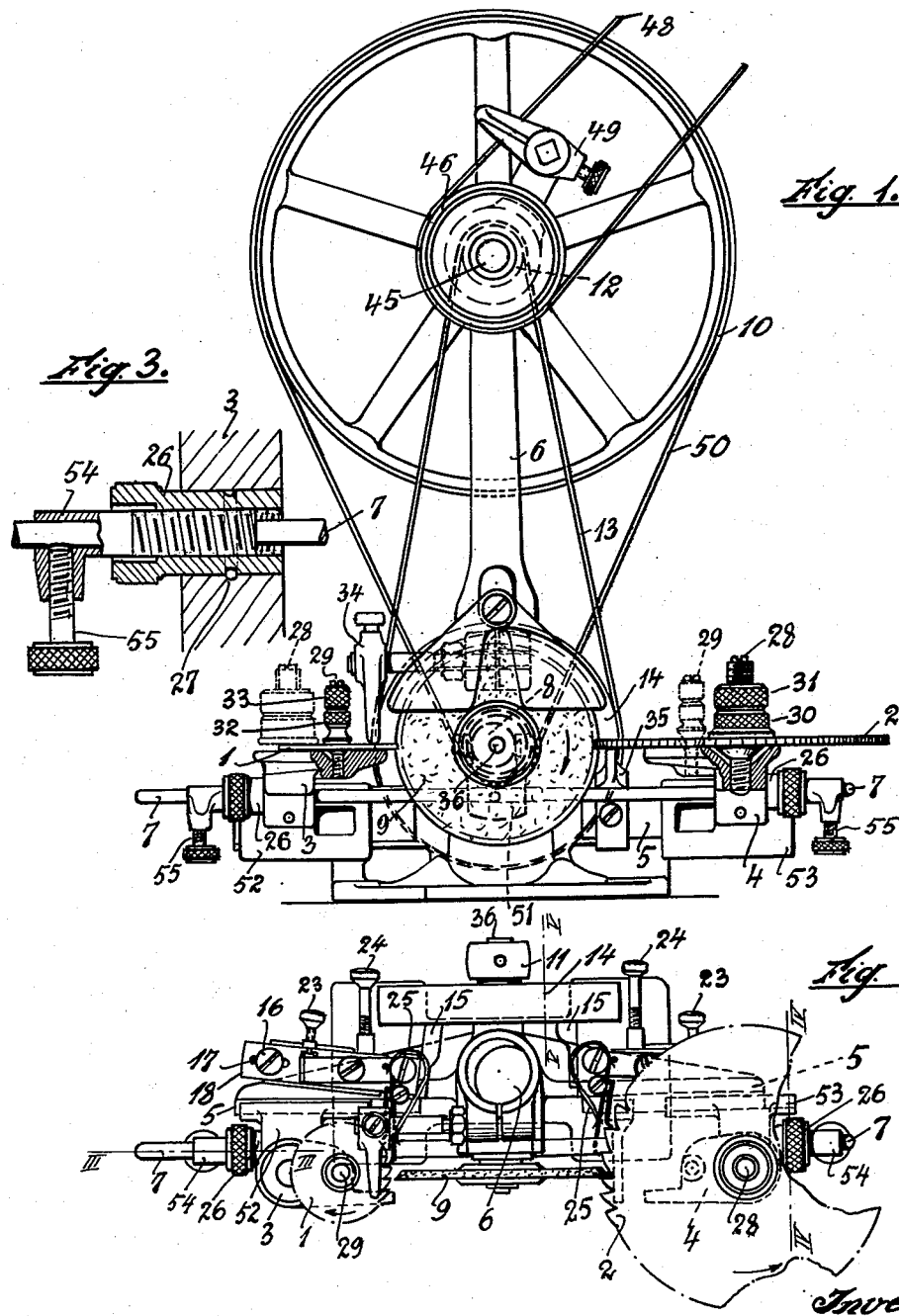

Feb. 25, 1930.  J. STREHLE  1,748,686
SAW SHARPENING MACHINE
Filed Jan. 13, 1927  2 Sheets-Sheet 2
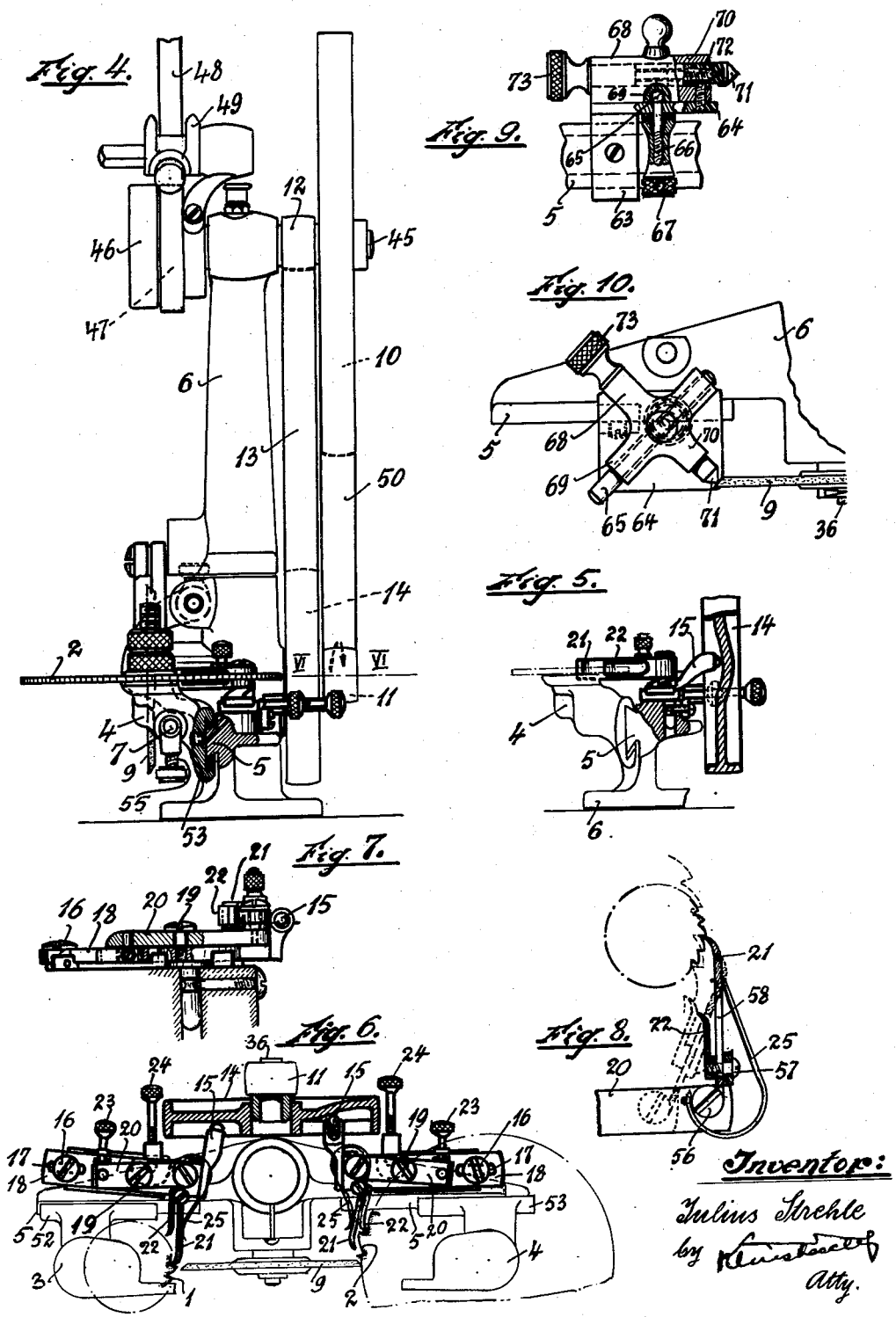

Patented Feb. 25, 1930

1,748,686

UNITED STATES PATENT OFFICE

JULIUS STREHLE, OF ESSLINGEN-ON-THE-NECKAR, GERMANY, ASSIGNOR TO AUGUST HEINRICH SCHMIDT, OF STUTTGART, GERMANY

SAW-SHARPENING MACHINE

Application filed January 13, 1927, Serial No. 160,853, and in Germany February 27, 1925.

My invention relates to saw-sharpening machines and more particularly to machines for sharpening circular saw blades. It is an object of my invention to increase the output of the machine as compared with existing machines. To this end I provide means for alternately applying the grinding tool, such as for instance a grinding wheel, to two saw blades which are chucked in the machine on opposite sides of said wheel.

In the practice of my invention I provide a stationary grinding wheel in combination with a reciprocating support for two blades chucked on opposite sides of the wheel. The blades are alternately presented to the grinding wheel and while the grinding wheel is operating on one of the blades the other blade is fed forward one tooth so as to be ready to be presented to the grinding wheel when it has completed its work on the other blade. This blade is now fed forward and the blade which had previously been fed, is presented to the grinding wheel, etc. In this manner the machine operates without any lost strokes as the feeding stroke for one blade corresponds to the sharpening stroke for the other blade, and vice versa.

I am not limited to the combination of a grinding wheel with a single pair of blades but I may provide any suitable number of pairs in combination with a stationary or reciprocating grinding wheel.

In the drawings accompanying this specification and forming part thereof a machine embodying my invention is illustrated diagrammatically by way of example.

In the drawings—

Figs. 1 to 8 illustrate a machine having a stationary grinding wheel in combination with a reciprocating tool support, Figs. 9 and 10 are an elevation and a plan view, respectively, showing a device for sharpening the grinding wheel.

More particularly,

Fig. 1 is an elevation, partly in section, of the first-mentioned grinding machine having a stationary grinding wheel and a reciprocating tool support, Fig. 2 is a plan view of the machine, Fig. 3 is a section on the line III—III in Fig. 2, on a larger scale, Fig. 4 is an end elevation of the machine partly in section on the line IV—IV in Fig. 2, Fig. 5 is a part end elevation of the machine, partly in section on the line V—V in Fig. 2, Fig. 6 is a plan view corresponding to Fig. 2 and showing in detail, and partly in section on the line VI—VI in Fig. 4, the mechanism for feeding forward the saw blades, Fig. 7 is an illustration corresponding to Fig. 5 but drawn to a large scale, Fig. 8 illustrates the end of one of the feed-pawl levers on a larger scale.

Referring now to the drawings, and first to Figs. 1 to 8, 6 is the standard of the machine in which is carried the main driving shaft 45, 46 and 47 are fast and loose pulleys on the front end of the shaft and 48 is a belt by which rotation is imparted to the pulleys. 49 is a belt shifter for throwing in and out the belt drive 48. 10 is a pulley on the rear end of the shaft 45 and 13 is a belt operatively connecting said pulley with a small pulley 11 on the shaft 36 of the grinding wheel 9. 12 is a small pulley on the shaft 45 intermediate the pulley 10 and the standard 6, 14 is a pulley of larger diameter which is free to rotate on the tubular boss of the pulley 11 as best seen in Fig. 6, and is therefore independent of the shaft 36, and 13 is a belt operatively connecting the pulleys 12 and 14.

An eccentric 8 is mounted on the shaft 36 of the grinding wheel and adapted to engage a fork-shaped part 51 on a push-bar 7 so that reciprocation is imparted to the bar when the shaft 36 is rotating. 3 and 4 are supports for the circular saw blades 1 and 2. In the present instance the saw blade 1 is of smaller diameter than the saw blade 2 but obviously saw blades of equal diameter may also be chucked on the supports 3 and 4. The supports are provided with dove-tailed brackets 52 and 53 which move on a corresponding slide bar 5 in the base of the standard 6. 26 is a sleeve rotatably carried in each support 3 and 4 and held against axial displacement with respect to the support by a pin 27 as shown in Fig. 3. The sleeve 26 is threaded on the inside and its thread is engaged by the threaded end of a sleeve 54 which is placed on the push-bar 7 and adapted to be secured thereon by a set screw 55. By these means the supports may be secured on the push-bar 7 in any desired relative position.

Two chucks 28 and 29 are provided for each support 3 and 4 to adapt the supports to suit varying diameters of the blades 1 and 2. In Fig. 1 the chuck 28 is used for the blade 2 and the chuck 29 is used for the blade 1, the chucks that are not in use being indicated in dotted lines. Nuts 30 and 31, and 33 and 32 respectively, are provided on the chucks for holding the blades in position and means such as a graduation may be provided on one of the nuts to facilitate exact chucking of the blades.

The mechanism 5 for feeding the blades is illustrated in Figs. 6, 7 and 8. As the mechanisms are identical for the two blades, only the mechanism for the blade 1 will be described. The mechanism for the blade 2 has been marked with the same reference numerals. 18 is a rail the effective length of which may be varied by means of a screw 16 and a slotted hole 17, and 15 is an abutment at the free end of the rail 18. 20 is a bar adapted to rock about a pin 19 on the rail 18, and 21 and 22 are pawls adapted to pivot about a screw 56 at the end of the bar 20 and held engaged with the teeth of the blade 1 or 2 by means of a spring 25. Angular adjustment of the bar 20 relative to rail 18 is limited by an adjustable abutment 23, the rocking movement of the rail 18 is limited by a similar abutment 24. The pawl 22 is secured to the pawl 21 by means of a screw 57 and adapted to be displaced in a slot 58 so that the relative position of the pawls may be varied. As shown in Fig. 8 the longer pawl 21 is used for feeding blades of small diameter and the shorter pawl 22 is used for blades of larger diameter.

The two mechanisms are operated by the cam-shaped body of the pulley 14, the cam being so arranged with respect to the eccentric 8 that one of the mechanisms becomes operative when the respective blade has been ground and been withdrawn from the grinding wheel, and in this manner the return stroke is not lost.

To prevent bending and chattering of the blades, fingers 34 and 35 are provided for the blades 1 and 2 by which the respective blades are held against the tangential pressure of the grinding wheel which is rotating clockwise as indicated by the arrow in Fig. 1.

Referring now to Figs. 9 and 10 the grinding device is constituted by a support 63 which is adapted to be placed on the slide bar 5 or 61, as the case may be, instead of one of the blade supports. 64 is a table on the support 63 and 65 is a slide bar which may be of semi-circular cross-section and is adapted to be adjusted on the table 64 by means of a spindle 66 and a set screw 67. The tool holder 68 is shaped as a spider and seated on the adjustable slide bar 65 by means of a channel-shaped port 69. 70 is a toolholder on the spider extending at right angles to the port 69, and the sharpening tool 71, with a diamond point, is adapted to be displaced axially in the holder 70 by means of a threaded spindle 72 with a knurled nut 73.

I wish it to be understood that I do not desire to be limited to the exact details of construction shown and described for obvious modifications will occur to a person skilled in the art.

I claim:—

1. A saw sharpening machine comprising a grinding wheel, means for imparting rotation to said grinding wheel, a pair of blade supports arranged on opposite sides of said grinding wheel, and automatically active means for alternately bringing two blades of different diameter mounted on said supports into operative engagement with said grinding wheel.

2. A saw sharpening machine comprising a grinding wheel, means for imparting rotation to said grinding wheel, a pair of blade supports arranged on opposite sides of said grinding wheel, and means for alternately bringing said blades into operative engagement with said grinding wheel and for feeding one of said blades while the other is being ground.

3. A saw sharpening machine comprising a grinding wheel, means for imparting rotation to said grinding wheel, a pair of blade supports arranged on opposite sides of said grinding wheel, means for varying the relative distance of said supports, and automatically active means for alternately bringing two blades of different diameter mounted on said supports into operative engagement with said grinding wheel.

4. A saw sharpening machine comprising a grinding wheel, means for imparting rotation to said grinding wheel, a pair of blade supports arranged on opposite sides of said grinding wheel, a bar connected with each of said supports, means for adjusting said supports on said bar, and automatically active means for alternately bringing two blades of different diameter mounted on said supports into operative engagement with said grinding wheel.

5. A saw sharpening machine comprising a frame, a grinding wheel rotatably carried in said frame, means for imparting rotation to said grinding wheel, a dove-tailed slide bar on said frame, a pair of supports arranged on opposite sides of said grinding wheel and adapted to be displaced on said slide bar, and automatically active means for alternately bringing two blades of different diameter mounted on said supports into operative engagement with said grinding wheel.

6. A saw sharpening machine comprising a grinding wheel, means for imparting rotation to said grinding wheel, a pair of blade supports arranged on opposite sides of said grinding wheel, a rotary cam, means for rotating said cam, pawls for feeding each blade operatively connected with said cam, and means for alternately bringing said blades into operative engagement with said grinding wheel.

In testimony whereof I affix my signature.

JULIUS STREHLE.